(12) United States Patent
Shinoya et al.

(10) Patent No.: US 10,890,862 B2
(45) Date of Patent: Jan. 12, 2021

(54) DEVELOPING CARTRIDGE

(71) Applicant: BROTHER KOGYO KABUSHIKI KAISHA, Nagoya (JP)

(72) Inventors: Shota Shinoya, Nisshin (JP); Junichi Hashimoto, Toyohashi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 122 days.

(21) Appl. No.: 16/357,881

(22) Filed: Mar. 19, 2019

(65) Prior Publication Data

US 2019/0302648 A1 Oct. 3, 2019

(30) Foreign Application Priority Data

Mar. 28, 2018 (JP) .................................. 2018-062253

(51) Int. Cl.
*G03G 15/08* (2006.01)
*F16H 1/22* (2006.01)

(52) U.S. Cl.
CPC .......... *G03G 15/0872* (2013.01); *F16H 1/22* (2013.01)

(58) Field of Classification Search
CPC .............................. G03G 15/0872; F16H 1/22
See application file for complete search history.

(56) References Cited

U.S. PATENT DOCUMENTS

| | | | | |
|---|---|---|---|---|
| 5,264,900 A * | 11/1993 | Momiyama | ........ | G03G 15/0822 366/279 |
| 6,118,960 A * | 9/2000 | Nakagawa | ......... | G03G 21/1857 399/111 |
| 7,027,756 B2 * | 4/2006 | Hoshi | ................. | G03G 21/181 399/111 |
| 7,155,151 B2 * | 12/2006 | Okamoto | ............. | G03G 15/065 399/279 |
| 2001/0022902 A1 * | 9/2001 | Nittani | ............... | G03G 21/1857 399/111 |
| 2005/0063733 A1 * | 3/2005 | Jeon | .................... | G03G 15/0896 399/167 |

(Continued)

FOREIGN PATENT DOCUMENTS

| | | |
|---|---|---|
| JP | 9-197815 A | 7/1997 |
| JP | 2007-148287 A | 6/2007 |

(Continued)

*Primary Examiner* — David J Bolduc
(74) *Attorney, Agent, or Firm* — Merchant & Gould P.C.

(57) ABSTRACT

A developing cartridge including: a housing capable of accommodating therein toner; a developing roller rotatable about a first axis extending in an axial direction; a supply roller rotatable about a second axis extending in the axial direction; a coupling rotatable about a third axis extending in the axial direction; a developing roller gear rotatable about the first axis together with the developing roller; a supply roller gear rotatable about the second axis together with the supply roller; a large-diameter gear rotatable about the third axis together with the coupling and meshing with the developing roller gear; a small-diameter gear rotatable about the third axis together with the coupling and having a diameter smaller than a diameter of the large-diameter gear; and an idle gear rotatable about a fourth axis extending in the axial direction and meshing with the supply roller gear and the small-diameter gear.

14 Claims, 9 Drawing Sheets

(56) References Cited

U.S. PATENT DOCUMENTS

| | | | |
|---|---|---|---|
| 2006/0024090 A1* | 2/2006 | Koido | G03G 15/0875 399/254 |
| 2006/0034637 A1* | 2/2006 | Kim | G03G 21/1825 399/228 |
| 2006/0257167 A1* | 11/2006 | Kim | G03G 15/757 399/167 |
| 2007/0031158 A1* | 2/2007 | Kamimura | G03G 21/1896 399/12 |
| 2007/0122176 A1 | 5/2007 | Sato | |
| 2007/0122188 A1* | 5/2007 | Igarashi | G03G 15/0896 399/119 |
| 2007/0237549 A1* | 10/2007 | Okabe | G03G 15/0896 399/222 |
| 2009/0169255 A1 | 7/2009 | Sato | |
| 2009/0297208 A1* | 12/2009 | Suzuki | G03G 21/1825 399/109 |
| 2011/0158704 A1* | 6/2011 | Takagi | G03G 15/0808 399/279 |
| 2011/0170892 A1* | 7/2011 | Ishida | G03G 21/1647 399/75 |
| 2011/0236062 A1* | 9/2011 | Takagi | G03G 21/1676 399/119 |
| 2011/0236065 A1* | 9/2011 | Takagi | G03G 15/0889 399/119 |
| 2011/0236066 A1* | 9/2011 | Takagi | G03G 15/0896 399/119 |
| 2012/0195634 A1* | 8/2012 | Kuriki | G03G 15/0818 399/281 |
| 2012/0219331 A1* | 8/2012 | Kobayashi | G03G 21/1821 399/279 |
| 2013/0051813 A1* | 2/2013 | Itabashi | G03G 21/1871 399/12 |
| 2013/0051815 A1* | 2/2013 | Itabashi | G03G 15/0867 399/12 |
| 2013/0051816 A1* | 2/2013 | Itabashi | G03G 21/1867 399/12 |
| 2013/0051833 A1* | 2/2013 | Itabashi | G03G 15/0865 399/90 |
| 2013/0051852 A1 | 2/2013 | Okabe et al. | |
| 2013/0058675 A1* | 3/2013 | Anan | G03G 21/1652 399/90 |
| 2013/0170844 A1* | 7/2013 | Itabashi | G03G 21/1896 399/12 |
| 2013/0170845 A1* | 7/2013 | Itabashi | G03G 15/757 399/12 |
| 2014/0086613 A1* | 3/2014 | Itabashi | G03G 15/0863 399/90 |
| 2014/0140740 A1* | 5/2014 | Yamane | G03G 15/0808 399/274 |
| 2015/0003868 A1* | 1/2015 | Shimizu | G03G 21/1647 399/119 |
| 2015/0093158 A1* | 4/2015 | Ebe | G03G 15/0818 399/286 |
| 2015/0117873 A1* | 4/2015 | Mori | G03G 21/1647 399/12 |
| 2015/0117906 A1* | 4/2015 | Mori | G03G 15/0867 399/254 |
| 2015/0139692 A1 | 5/2015 | Shimizu et al. | |
| 2015/0139701 A1* | 5/2015 | Noda | G03G 15/0865 399/279 |
| 2015/0192880 A1* | 7/2015 | Noda | G03G 15/0889 399/12 |
| 2015/0192891 A1* | 7/2015 | Noda | G03G 15/0806 399/119 |
| 2015/0192894 A1* | 7/2015 | Noda | G03G 21/1814 399/111 |
| 2015/0205255 A1* | 7/2015 | Mori | G03G 21/1647 399/113 |
| 2017/0097588 A1* | 4/2017 | Fukamachi | G03G 15/0891 |
| 2018/0267455 A1* | 9/2018 | Isaka | G03G 21/1647 |

FOREIGN PATENT DOCUMENTS

| | | |
|---|---|---|
| JP | 2009-162906 A | 7/2009 |
| JP | 2013-54051 A | 3/2013 |
| JP | 2015-99227 A | 5/2015 |

\* cited by examiner

DEVELOPING CARTRIDGE

CROSS-REFERENCE TO RELATED APPLICATIONS

This application claims priority from Japanese Patent Application No. 2018-062253 filed on Mar. 28, 2018, the entire contents of which are incorporated herein by reference.

TECHNICAL FIELD

The present disclosure relates to a developing cartridge.

BACKGROUND

In the related art, a developing cartridge including a developing roller and a supply roller has been known. A rotating direction of the supply roller is opposite to a rotating direction of the developing roller. Also, a rotational speed of the supply roller is larger than a rotational speed of the developing roller.

In the developing cartridge, since the rotational speed of the supply roller is larger than the rotational speed of the developing roller, friction between an outer surface of the supply roller and toner accommodated in a housing increases, so that the toner accommodated in the housing may be early deteriorated.

SUMMARY

It is therefore an object of the present disclosure to provide a developing cartridge capable of suppressing deterioration of toner.

According to an illustrative embodiment of the present disclosure, there is provided a developing cartridge including: a housing capable of accommodating therein toner; a developing roller rotatable about a first axis extending in an axial direction and having an outer surface; a supply roller rotatable about a second axis extending in the axial direction and configured to supply the toner accommodated in the housing to the outer surface of the developing roller; a coupling rotatable about a third axis extending in the axial direction; a developing roller gear rotatable about the first axis together with the developing roller; a supply roller gear rotatable about the second axis together with the supply roller; a large-diameter gear rotatable about the third axis together with the coupling and configured to mesh with the developing roller gear; a small-diameter gear rotatable about the third axis together with the coupling, having a diameter smaller than a diameter of the large-diameter gear and located at a position different from the large-diameter gear in the axial direction, and an idle gear rotatable about a fourth axis extending in the axial direction and configured to mesh with the supply roller gear and the small-diameter gear.

DETAILED DESCRIPTION

Outline of Developing Cartridge

An outline of a developing cartridge 1 is described with reference to FIGS. 1 and 2.

Figure 1:
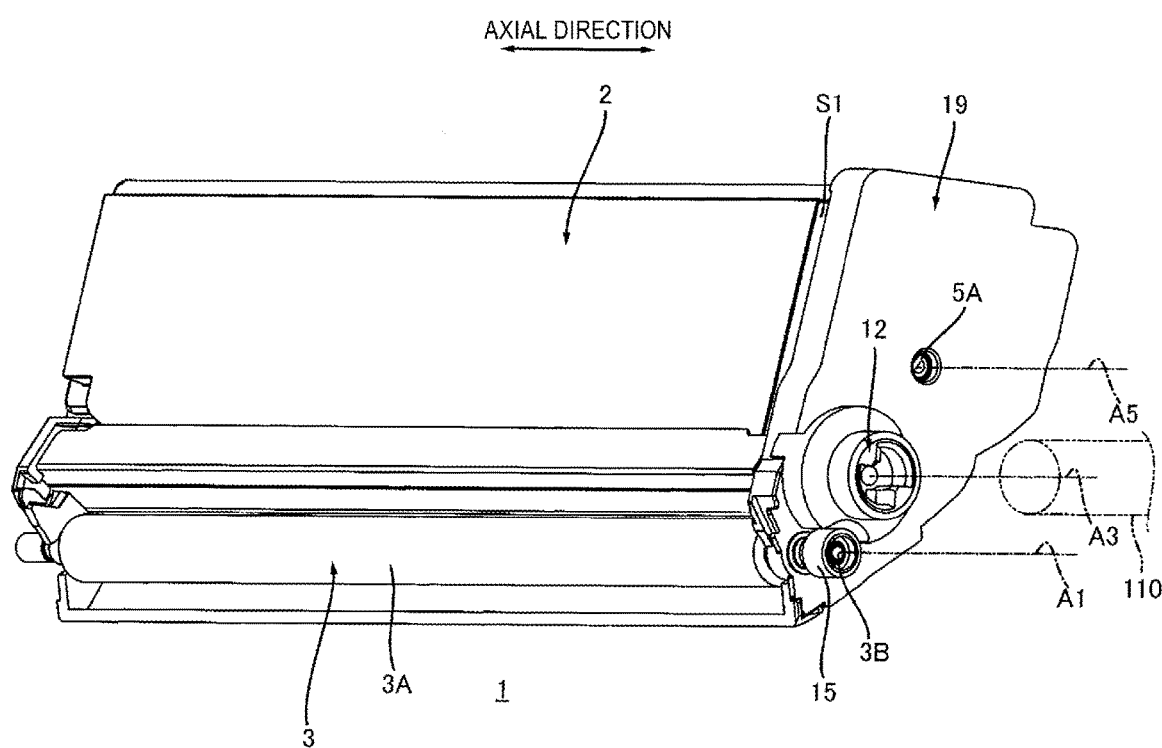
FIG. 1 is a perspective view depicting a developing cartridge in accordance with an illustrative embodiment of the present disclosure.
Figure 2:
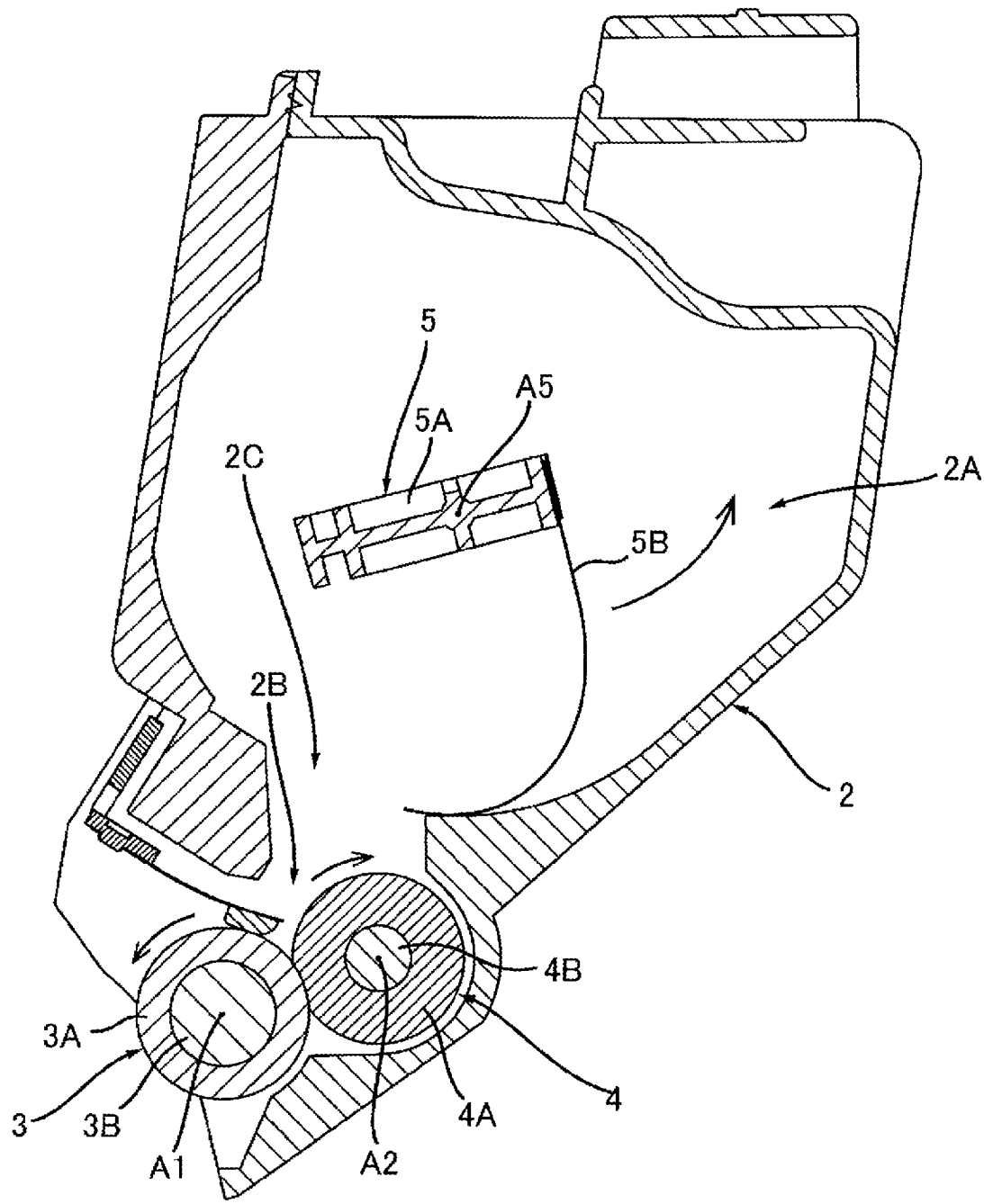
FIG. 2 is a sectional view at an axial center of the developing cartridge shown in FIG. 1.

As shown in FIG. 1, the developing cartridge 1 includes a housing 2, a developing roller 3, a supply roller 4 (refer to FIG. 2), and an agitator 5 (refer to FIG. 2).

1.1 Housing

The housing 2 can accommodate therein toner. The housing 2 extends in an axial direction. The housing 2 has a cylindrical shape. As shown in FIG. 2, the housing 2 includes a toner accommodation chamber 2A, a developing chamber 2B, and a passage 2C. The toner accommodation chamber 2A can accommodate therein the toner. In the toner accommodation chamber 2A, the agitator 5 is accommodated. In the developing chamber 2B, the supply roller 4 is accommodated. The passage 2C interconnects the toner accommodation chamber 2A and the developing chamber 2B. The developing chamber 2B is located below the toner accommodation chamber 2A in a state where the developing cartridge 1 is mounted to an image forming apparatus main body 100 (which will be described later).

1.2 Developing Roller

The developing roller 3 is rotatable about a first axis A1 extending in the axial direction. The developing roller 3 has a developing roller main body 3A and a developing roller shaft 3B.

The developing roller main body 3A extends in the axial direction. The developing roller main body 3A has a circular cylinder shape. The developing roller main body 3A is made of conductive rubber.

The developing roller shaft 3B is located in the developing roller main body 3A in a radial direction of the developing roller main body 3A. The developing roller shaft 3B extends in the axial direction. The developing roller shaft 3B passes through the developing roller main body 3A in the axial direction. The developing roller shaft 3B may not pass through the developing roller main body 3A in the axial direction. The developing roller shaft 3B may extend from an end portion of the developing roller main body 3A in the axial direction. The developing roller shaft 3B is rotatable about the first axis A1 together with the developing roller 3. Specifically, the developing roller shaft 3B is rotatable about the first axis A1 together with the developing roller main body 3A. The developing roller shaft 3B has a circular cylinder shape. The developing roller shaft 3B is made of metal.

1.3 Supply Roller

The supply roller 4 is configured to supply the toner accommodated in the housing 2 to an outer surface of the developing roller 3. Specifically, the supply roller 4 is configured to supply the toner in the developing chamber 2B to the outer surface of the developing roller 3. The supply roller 4 is located in the developing chamber 2B. The supply roller 4 is in contact with the developing roller 3. The supply roller 4 may not be in contact with the developing roller 3. The supply roller 4 is rotatable about a second axis A2 extending in the axial direction. Although described in detail later, the supply roller 4 is rotatable in an opposite rotating direction to a rotating direction of the developing roller 3. The supply roller 4 includes a supply roller main body 4A and a supply roller shaft 4B.

The supply roller main body 4A extends in the axial direction. The supply roller main body 4A has a circular cylinder shape. A diameter of the supply roller main body 4A is substantially the same as a diameter of the developing roller main body 3A. The supply roller main body 4A is made of sponge. The supply roller main body 4A is in contact with the developing roller main body 3A.

The supply roller shaft 4B is located in the supply roller main body 4A in a radial direction of the supply roller main body 4A. The supply roller shaft 4B extends in the axial direction. The supply roller shaft 4B passes through the supply roller main body 4A in the axial direction. The supply roller shaft 4B may not pass through the supply roller main body 4A in the axial direction. The supply roller shaft 4B may extend from an end portion of the supply roller main body 4A in the axial direction. The supply roller shaft 4B is rotatable about the second axis A2 together with the supply roller 4. Specifically, the supply roller shaft 4B is rotatable about the second axis A2 together with the supply roller main body 4A.

1.4 Agitator

The agitator 5 is configured to stir the toner accommodated in the housing 2. Specifically, the agitator 5 is configured to stir the toner in the toner accommodation chamber 2A. The agitator 5 is located in the toner accommodation chamber 2A. The agitator 5 is rotatable about a fifth axis A5 extending in the axial direction. Although described in detail later, the agitator 5 is rotatable in an opposite rotating direction to the rotating direction of the supply roller 4. The agitator 5 includes an agitator shaft 5A and a film 5B.

The agitator shaft 5A extends in the axial direction. The agitator shaft 5A is rotatable about the fifth axis A5 together with the agitator 5.

The film 5B is attached to the agitator shaft 5A. The film 5B is rotatable together with the agitator shaft 5A. The film 5B is made of a flexible resin.

2. Details of Developing Cartridge

The developing cartridge 1 is described in detail with reference to FIGS. 3 to 6.

Figure 3:
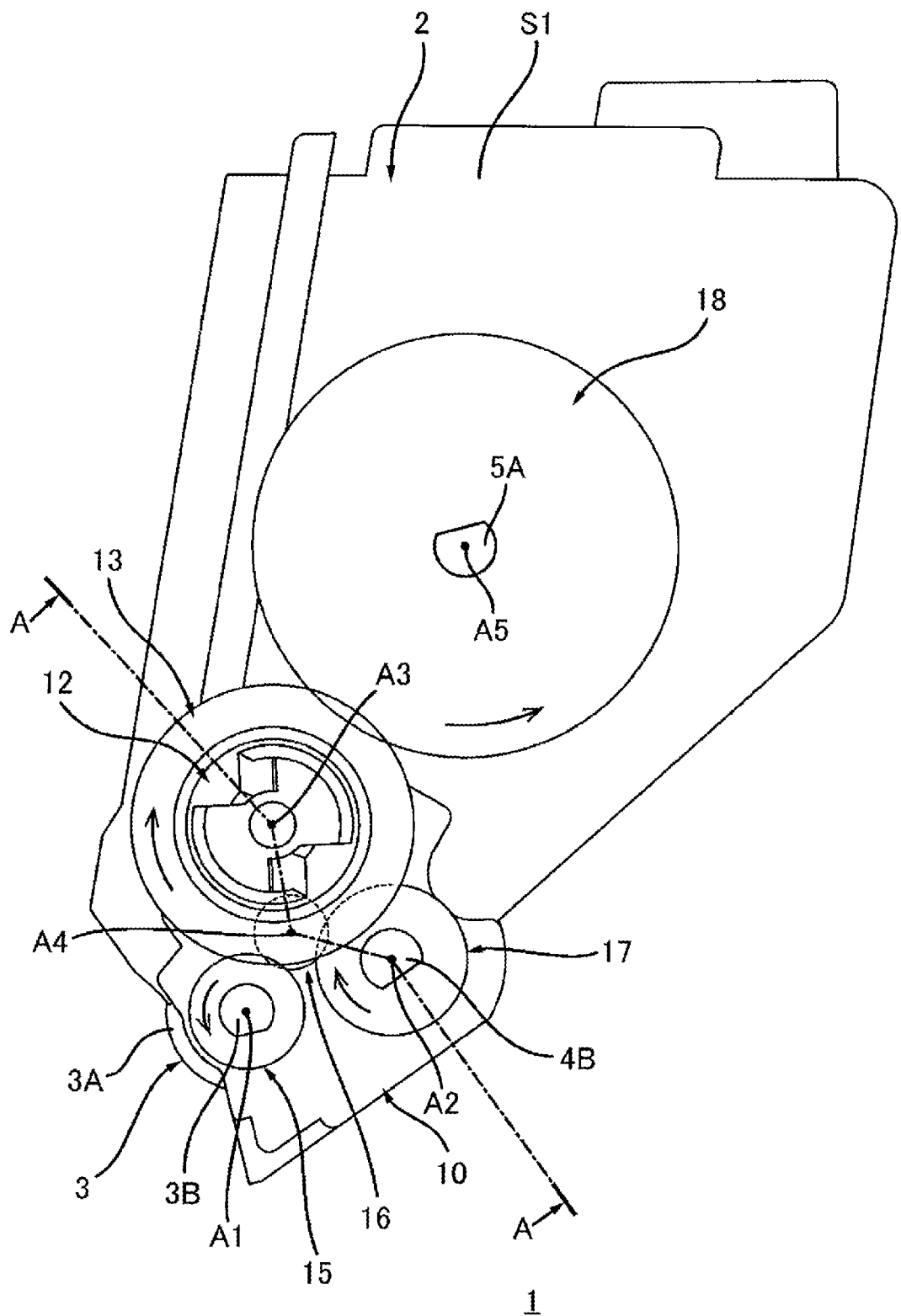
FIG. 3 is a side view of the developing cartridge shown in FIG. 1, depicting a state where a gear cover is removed.
Figure 5:
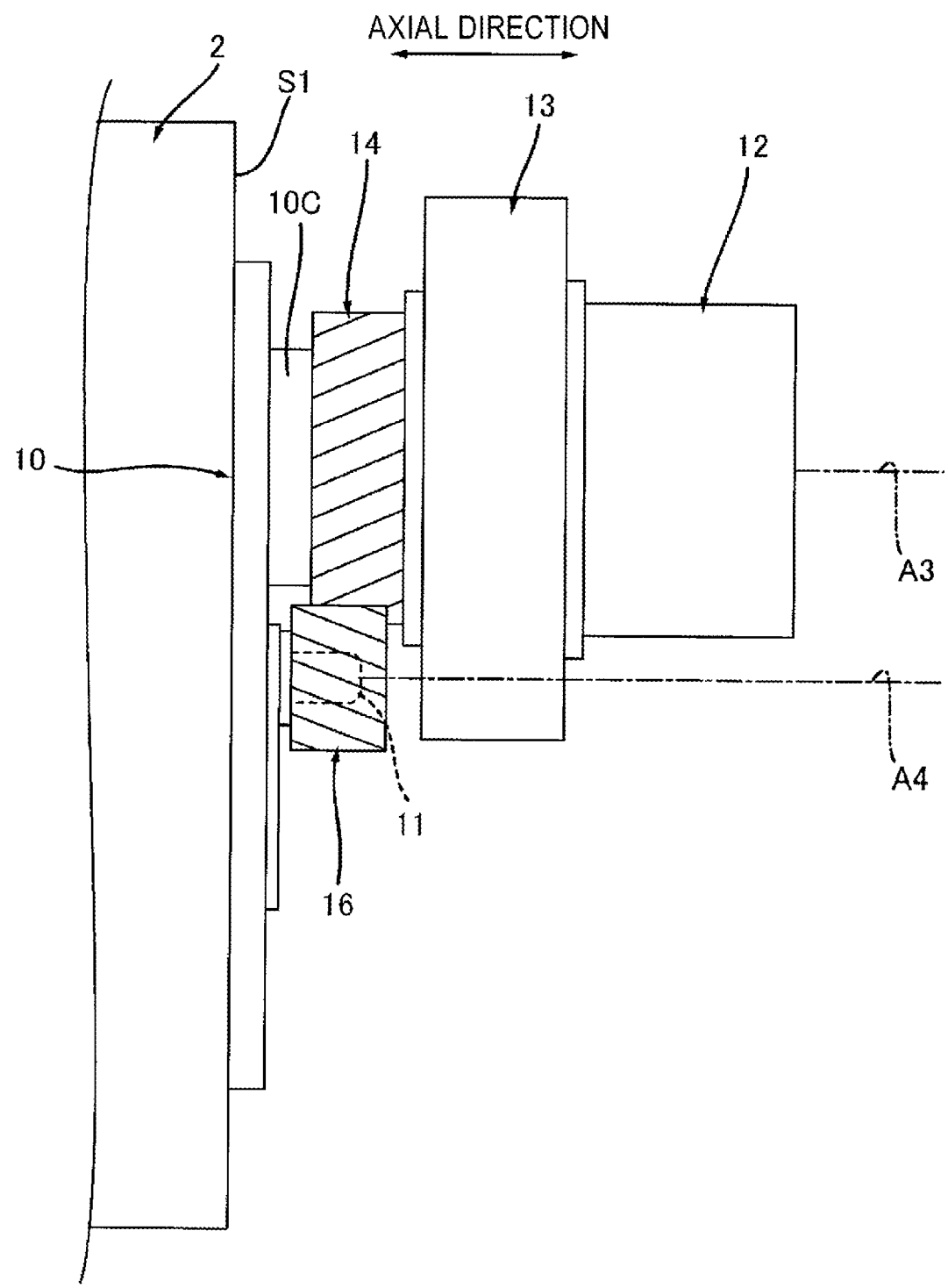
FIG. 5 illustrates meshing between an idle gear and a small-diameter gear shown in FIG. 3.
Figure 6:
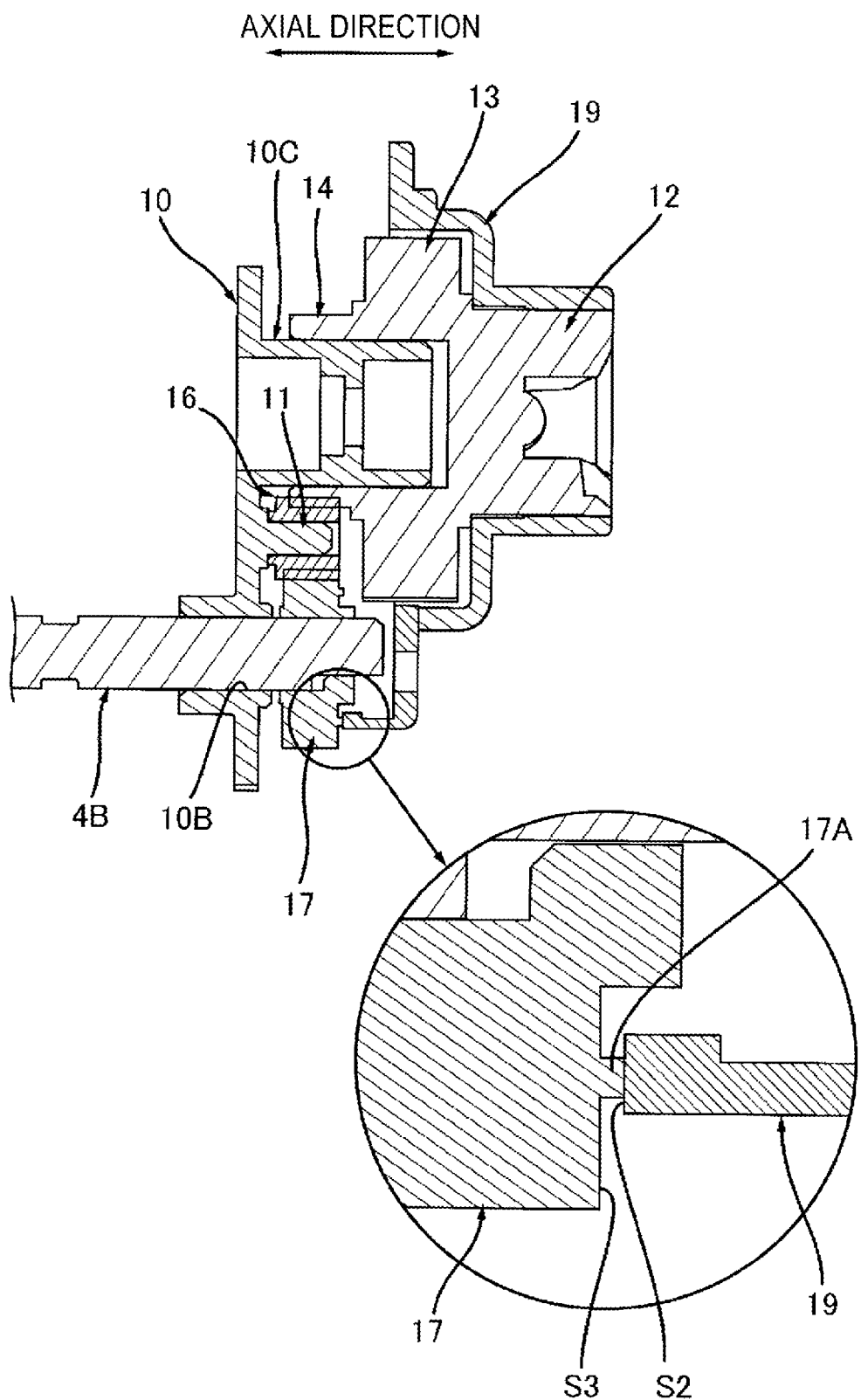
FIG. 6 illustrates a contact state between a supply roller gear and a gear cover, depicting a section taken along a line A-A of FIG. 3.

As shown in FIG. 3, the developing cartridge 1 includes a bearing 10, a boss 11 (refer to FIG. 4), a coupling 12, a large-diameter gear 13, a small-diameter gear 14 (refer to FIG. 5), a developing roller gear 15, an idle gear 16, a supply roller gear 17, an agitator gear 18, and a gear cover 19 (refer to FIG. 6).

2.1 Bearing

Figure 4:
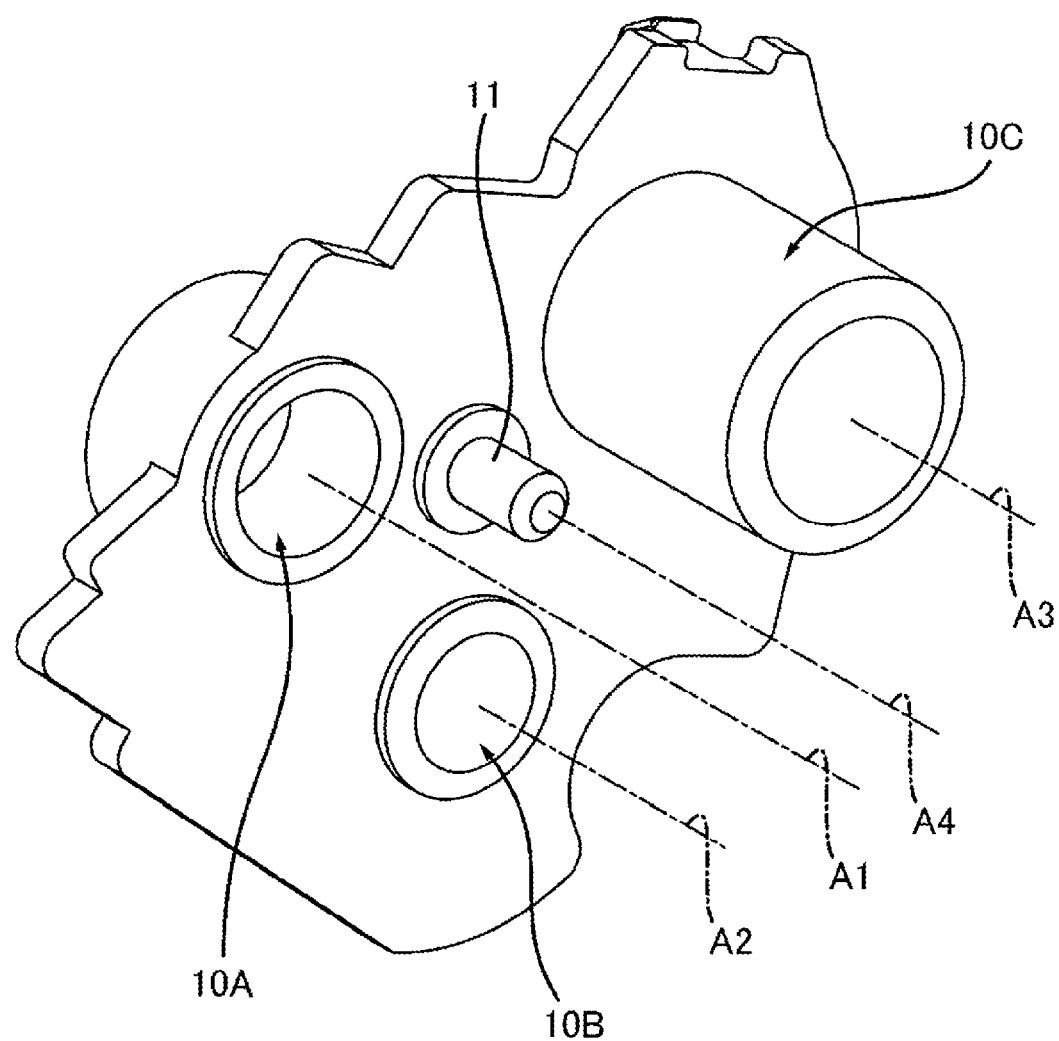
FIG. 4 is a perspective view of a bearing shown in FIG. 3.

The bearing 10 is located at an outer surface S1 of the housing 2 in the axial direction. Specifically, the bearing 10 is mounted to the outer surface S1 of the housing 2. In the meantime, the bearing 10 may be mounted to the outer surface S1 of the housing 2 via a separate member. As shown in FIG. 4, the bearing 10 has a first hole 10A, a second hole 10B, and a circular cylinder 10C.

The first hole 10A is a through-hole. The first hole 10A has a circular shape. The developing roller shaft 3B (refer to FIG. 3) is fitted in the first hole 10A. Thereby, the bearing 10 receives the developing roller shaft 3B. The developing roller shaft 3B is rotatable relative to the bearing 10.

The second hole 10B is a through-hole. The second hole 10B has a circular shape. The supply roller shaft 4B (refer to FIG. 3) is fitted in the second hole 10B. Thereby, the bearing 10 receives the supply roller shaft 4B. The supply roller shaft 4B is rotatable relative to the bearing 10.

The circular cylinder 10C extends along a third axis A3 extending in the axial direction. As shown in FIG. 5, the circular cylinder 10C supports the coupling 12, the large-diameter gear 13 and the small-diameter gear 14.

2.2 Boss

As shown in FIG. 4, the boss 11 extends in the axial direction from the bearing 10. That is, the boss 11 is integrated with the bearing 10. The boss 11 may be a separate member from the bearing 10 and may be mounted to the bearing 10. The boss 11 extends along a fourth axis A4 extending in the axial direction. The boss 11 has a circular cylinder shape. The boss 11 is located between the first hole 10A and the circular cylinder 10C in a direction directed from the first axis A1 toward the third axis A3. Also, as shown in FIG. 5, the boss 11 is located between the large-diameter gear 13 and the outer surface S1 of the housing 2 in the axial direction.

2.3 Coupling

Figure 7:
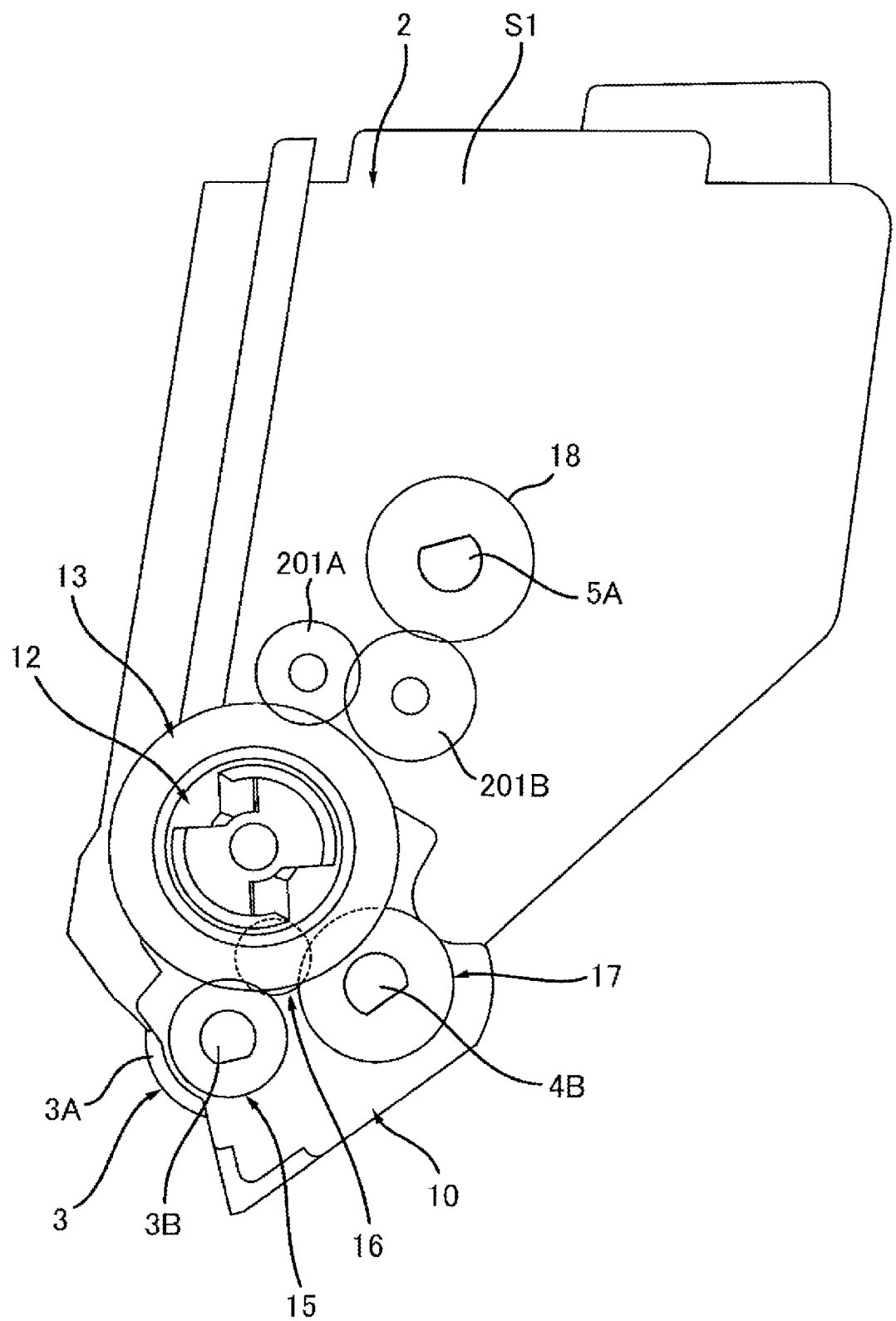
FIG. 7 depicts a modified embodiment of the developing cartridge, in which two idle gears are located between a large-diameter gear and an agitator gear.

As shown in FIG. 1, a main body coupling 110 of the image forming apparatus main body 100 is fitted in the coupling 12, in a state where the developing cartridge 1 is mounted to the image forming apparatus main body 100 (refer to FIG. 7) (which will be described later). The coupling 12 is rotatable about the third axis A3 extending in the axial direction. The coupling 12 is rotatable about the circular cylinder 10C (refer to FIG. 4) of the bearing 10. The coupling 12 extends in the axial direction. The coupling 12 has a circular cylinder shape.

2.4 Large-Diameter Gear

As shown in FIG. 3, the large-diameter gear 13 is rotatable about the third axis A3 together with the coupling 12. The large-diameter gear 13 is rotatable about the circular cylinder 10C (refer to FIG. 4) of the bearing 10 together with the coupling 12. As shown in FIG. 5, the large-diameter gear 13 is located between the coupling 12 and the small-diameter gear 14 in the axial direction. The large-diameter gear 13 has a diameter lager than a diameter of the small-diameter gear 14. Specifically, a diameter of a tooth tip circle of the large-diameter gear 13 is larger than a diameter of a tooth tip circle of the small-diameter gear 14. In the meantime, the large-diameter gear 13 may be a spur gear or a helical gear.

2.5 Small-Diameter Gear

The small-diameter gear 14 is rotatable about the third axis A3 together with the coupling 12. The small-diameter gear 14 is rotatable about the circular cylinder 10C of the bearing 10 together with the coupling 12. The small-diameter gear 14 is located at a position different from the large-diameter gear 13 in the axial direction. Specifically, the small-diameter gear 14 is located between the large-diameter gear 13 and the outer surface S1 of the housing 2 in the axial direction. The small-diameter gear 14 is a helical gear. The small-diameter gear 14 may have a spur gear. The small-diameter gear 14 has the diameter smaller than the diameter of the large-diameter gear 13. Specifically, the diameter of the tooth tip circle of the small-diameter gear 14 is smaller than the diameter of the tooth tip circle of the large-diameter gear 13. More specifically, a gear ratio of the small-diameter gear 14 to the supply roller gear 17 (refer to FIG. 3) is smaller than a gear ratio of the large-diameter gear 13 to the developing roller gear 15 (refer to FIG. 3). Thereby, the supply roller gear 17 is rotatable at a rotational speed smaller than a rotational speed of the developing roller gear 15. That is, in a case where a diameter of the supply roller main body 4A is substantially the same as a diameter of the developing roller main body 3A, the supply roller 4 is rotatable at a peripheral speed slower than a peripheral speed of the developing roller 3. The small-diameter gear 14 is integrated with the coupling 12 and the large-diameter gear 13. The small-diameter gear 14 is configured as one component together with the coupling 12 and the large-diameter gear 13.

2.6 Developing Roller Gear

As shown in FIG. 1, the developing roller gear 15 is located at the outer surface S1 of the housing 2 in the axial direction. Specifically, the developing roller gear 15 is located at one end portion of the developing roller shaft 3B in the axial direction. The developing roller gear 15 is mounted to one end portion the developing roller shaft 3B in the axial direction. As shown in FIG. 3, the developing roller gear 15 is rotatable about the first axis A1 together with the developing roller 3. Specifically, the developing roller gear 15 is rotatable about the first axis A1 together with the developing roller shaft 3B. The developing roller gear 15 is configured to mesh with the large-diameter gear 13. The developing roller gear 15 has a diameter smaller than the diameter of the large-diameter gear 13. Specifically, a diameter of a tooth tip circle of the developing roller gear 15 is smaller than the diameter of the tooth tip circle of the large-diameter gear 13. In the meantime, the developing roller gear 15 may be a spur gear or a helical gear.

2.7 Idle Gear

As shown in FIG. 5, the idle gear 16 is mounted to the boss 11 of the bearing 10. Thereby, the idle gear 16 is located at the outer surface S1 of the housing 2 via the bearing 10. The idle gear 16 is rotatable about the boss 11. That is, the idle gear 16 is rotatable about the fourth axis A4. At least a part of the idle gear 16 is located between the large-diameter gear 13 and the outer surface S1 of the housing 2 in the axial direction. In the meantime, at least a part of the idle gear 16 is located between the developing roller gear 15 (refer to FIG. 3) and the outer surface S1 of the housing 2 in the axial direction. The idle gear 16 is spaced from the developing roller gear 15 in the axial direction, so that the idle gear 16 is not in contact with the developing roller gear 15. The idle gear 16 is configured to mesh with the small-diameter gear 14. The idle gear 16 is a helical gear. The idle gear 16 is configured to rotate with a thrust force being applied. The thrust force is applied to the idle gear in a direction in which the idle gear 16 is to come close to the outer surface S1 of the housing 2 in the axial direction. The idle gear 16 may have a spur gear.

The idle gear 16 is configured to more decelerate the supply roller gear 17 than the developing roller gear 15. Specifically, as described above, the gear ratio of the small-diameter gear 14 to the supply roller gear 17 is smaller than the gear ratio of the large-diameter gear 13 to the developing roller gear 15, so that the rotational speed of the supply roller gear 17 (refer to FIG. 3) coupled to the small-diameter gear 14 via the idle gear 16 is smaller than the rotational speed of the developing roller gear 15 (refer to FIG. 3).

When the developing roller 3 rotates in such a state, the supply roller 4 intends to rotate in an opposite rotating direction to the rotating direction of the developing roller 3 at the rotational speed, which is the same as the rotational speed of the developing roller 3, by a frictional force with the developing roller 3, not by power transmitted from the supply roller gear 17.

However, since the rotational speed of the supply roller gear 17 is smaller than the rotational speed of the developing roller gear 15, the supply roller 4 is decelerated by the supply roller gear 17. At this time, the supply roller gear 17 rotating together with the supply roller 4 meshes with the idle gear 16 and is thus decelerated.

2.8 Supply Roller Gear

As shown in FIG. 3, the supply roller gear 17 is located on the outer surface S1 of the housing 2 in the axial direction. Specifically, the supply roller gear 17 is located at one end portion of the supply roller shaft 4B in the axial direction. The supply roller gear 17 is mounted to one end portion of the supply roller shaft 4B in the axial direction. The supply roller gear 17 is rotatable about the second axis A2 together with the supply roller 4. Specifically, the supply roller gear 17 is rotatable about the second axis A2 together with the supply roller shaft 4B. The supply roller gear 17 is meshing with the idle gear 16. The supply roller gear 17 has a diameter larger than a diameter of the idle gear 16 and smaller than the diameter of the small-diameter gear 14. Specifically, a diameter of a tooth tip circle of the supply roller gear 17 is larger than a diameter of a tooth tip circle of the idle gear 16 and is smaller than the diameter of the tooth tip circle of the small-diameter gear 14. The supply roller gear 17 is a helical gear. The supply roller gear 17 is configured to rotate with a thrust force being applied. The thrust force is applied to the supply roller gear 17 in a direction in which the supply roller gear 17 is to be apart from the outer surface S1 of the housing 2 in the axial direction. The supply roller gear 17 may have a spur gear. The supply roller gear 17 has a protrusion 17A, as shown in FIG. 6.

The protrusion 17A is located at an outer surface S3 of the supply roller gear 17 in the axial direction. The protrusion 17A protrudes from the outer surface S3 in the axial direction.

2.9 Agitator Gear

As shown in FIG. 3, the agitator gear 18 is located at the outer surface S1 of the housing 2 in the axial direction. Specifically, the agitator gear 18 is located at one end portion of the agitator shaft 5A in the axial direction. The agitator gear 18 is mounted to one end portion of the agitator shaft 5A in the axial direction. The agitator gear 18 is rotatable about the fifth axis A5 together with the agitator 5. Specifically, the agitator gear 18 is rotatable about the fifth axis A5 together with the agitator shaft 5A. The agitator gear 18 is meshing with the large-diameter gear 13. In the meantime, the agitator gear 18 may be configured to mesh with the small-diameter gear 14 (refer to FIG. 5). In the meantime, the agitator gear 18 may be a spur gear or a helical gear.

2.10 Gear Cover

As shown in FIG. 1, the gear cover 19 is mounted to the outer surface S1 of the housing 2. The gear cover 19 covers the large-diameter gear 13, the small-diameter gear 14, the idle gear 16, the supply roller gear 17 and the agitator gear 18. As shown in FIG. 6, the gear cover 19 has a contact surface S2.

The contact surface S2 is located at an edge of the gear cover 19. The contact surface S2 is located at an opposite side of the housing 2 to the supply roller gear 17 in the axial direction. The contact surface S2 is in contact with the supply roller gear 17. The contact surface S2 is in contact with the outer surface S3 of the supply roller gear 17. The contact surface S2 is in contact with the protrusion 17A of the supply roller gear 17. The contact surface S2 may be located with being spaced from the supply roller gear 17. In a case where the supply roller gear 17 is moved in a direction of being apart from the outer surface S1 of the housing 2 by the thrust force, which is applied to the supply roller gear 17 according to the rotation of the supply roller gear 17, the contact surface S2 may be in contact with the supply roller gear 17.

3. Operations of Developing Cartridge

Subsequently, operations of the developing cartridge 1 are described.

As shown in FIG. 1, in the state where the developing cartridge 1 is mounted to the image forming apparatus main body 100 (refer to FIG. 7), the main body coupling 110 provided to the image forming apparatus main body 100 is fitted in the coupling 12. The main body coupling 110 is fitted in the coupling 12, so that the coupling 12 is rotatable about the third axis A3 together with the main body coupling 110.

As shown in FIG. 3, when the coupling 12 rotates, the large-diameter gear 13 and the small-diameter gear 14 (refer to FIG. 5) rotate together with the coupling 12.

The large-diameter gear 13 rotates, so that the developing roller gear 15 and the agitator gear 18 rotate.

Thereby, as shown in FIG. 2, the developing roller 3 and the agitator 5 rotate. The rotating direction of the agitator 5 is the same as the rotating direction of the developing roller 3.

When the developing roller 3 rotates, the supply roller 4 rotates in the opposite rotating direction to the rotating direction of the developing roller 3 by the frictional force with the developing roller 3, which is caused due to the contact with the developing roller 3.

Here, as described above, the gear ratio of the small-diameter gear 14 to the supply roller gear 17 is smaller than the gear ratio of the large-diameter gear 13 to the developing roller gear 15, so that the rotational speed of the supply roller gear 17 (refer to FIG. 3) is smaller than the rotational speed of the developing roller gear 15 (refer to FIG. 3).

For this reason, the supply roller 4 is decelerated by the supply roller gear 17 and rotates at the rotational speed smaller than the rotational speed of the developing roller 3. That is, when the diameter of the supply roller main body 4A is substantially the same as the developing roller main body 3A, the supply roller 4 rotates at the peripheral speed slower than the peripheral speed of the developing roller 3.

Thereby, the supply roller 4 rubs against the developing roller 3 while rotating in the opposite rotating direction to the rotating direction of the developing roller 3. The supply roller 4 rubs against the developing roller 3, so that the toner in the developing chamber 2B is frictionally charged and the charged toner is electrostatically carried on the outer surface of the developing roller 3.

In the meantime, the extra toner, which is not carried on the outer surface of the developing roller 3, of the toner in the developing chamber 2B is conveyed toward the toner accommodation chamber 2A by the rotation of the supply roller 4. The agitator 5 conveys the toner from the toner accommodation chamber 2A to the developing chamber 2B, and collects the toner, which has been conveyed toward the toner accommodation chamber 2A by the rotation of the supply roller 4, into the toner accommodation chamber 2A.

Thereby, it is possible to circulate the toner between the toner accommodation chamber 2A and the developing chamber 2B.

5. Operational Effects

According to the developing cartridge 1, as shown in FIG. 3, the developing roller gear 15 meshes with the large-diameter gear 13, and the supply roller gear 17 meshes with the idle gear 16 in mesh with the small-diameter gear 14 (refer to FIG. 5).

For this reason, as shown in FIG. 2, the supply roller 4 rotates in the opposite rotating direction to the rotating direction of the developing roller 3. That is, the outer surface of the supply roller 4 moves toward the same direction as the outer surface of the developing roller 3 at a part at which the developing roller 3 and the supply roller 4 are in contact with each other. Also, since the supply roller gear 17 meshes with the idle gear 16 that meshes with the small-diameter gear 14, the supply roller 4 is more decelerated than the developing roller 3.

Thereby, the force, which is applied to the toner at the part at which the developing roller 3 and the supply roller 4 are in contact with each other, is reduced.

As a result, it is possible to suppress deterioration of the toner.

Also, according to the developing cartridge 1, as shown in FIGS. 4 and 5, the idle gear 16 is supported by the boss 11 of the bearing 10 including the first hole 10A in which the developing roller shaft 3B is fitted and the second hole 10B in which the supply roller shaft 4B is fitted.

For this reason, it is possible to provide the idle gear 16 by using the bearing 10, without increasing the number of components.

Also, according to the developing cartridge 1, as shown in FIG. 5, the boss 11 is located between the large-diameter gear 13 and the outer surface S1 of the housing 2 in the axial direction.

For this reason, it is possible to provide the idle gear 16 by using a space between the large-diameter gear 13 and the outer surface S1 of the housing 2 and to suppress the developing cartridge 1 from being enlarged.

Also, according to the developing cartridge 1, as shown in FIG. 5, the small-diameter gear 14 is located between the large-diameter gear 13 and the outer surface S1 of the housing 2 in the axial direction. Also, at least a part of the idle gear 16 is located between the large-diameter gear 13 and the outer surface S1 of the housing 2 in the axial direction.

For this reason, it is possible to provide the small-diameter gear 14 and the idle gear 16 by using a space between the large-diameter gear 13 and the outer surface S1 of the housing 2 and to suppress the developing cartridge 1 from being enlarged.

Also, according to the developing cartridge 1, as shown in FIG. 5, the idle gear 16 is a helical gear. Also, the supply roller gear 17 (refer to FIG. 3) meshing with the idle gear 16 is also a helical gear. The idle gear 16 is configured to rotate with a thrust force being applied. The thrust force is applied to the idle gear 16 in the direction in which the idle gear 16 comes close to the outer surface S1 of the housing 2 in the axial direction.

For this reason, it is possible to prevent the large-diameter gear 13 and the idle gear 16 from coming close to each other in the axial direction when the idle gear 16 rotates, and to stably rotate the idle gear 16 in the space between the large-diameter gear 13 and the outer surface S1 of the housing 2.

Also, according to the developing cartridge 1, as shown in FIG. 6, the gear cover 19 has the contact surface S2 located at the opposite side of the housing 2 to the supply roller gear 17 in the axial direction and being in contact with the supply roller gear 17.

For this reason, it is possible to prevent the supply roller gear 17 from being moved in the direction of being apart from the outer surface S1 of the housing 2 due to the thrust force by the contact surface S2 of the gear cover 19.

As a result, it is possible to keep a meshed state between the idle gear 16 and the supply roller gear 17.

Also, according to the developing cartridge 1, as shown in FIG. 6, the contact surface S2 is in contact with the protrusion 17A of the outer surface S3 of the supply roller gear 17 in the axial direction.

Thereby, the contact surface S2 does not interfere with the rotation of the supply roller gear 17.

Also, according to the developing cartridge 1, as shown in FIG. 2, the agitator 5 is rotatable in the opposite rotating direction to the rotating direction of the supply roller 4.

Thereby, it is possible to collect the extra toner, which has been conveyed to the toner accommodation chamber 2A by the rotation of the supply roller 4, into the toner accommodation chamber 2A by the agitator 5.

6. Modified Embodiments

In the above illustrative embodiment, the small-diameter gear 14 is located between the large-diameter gear 13 and the outer surface S1 of the housing 2. However, the large-diameter gear 13 may be located between the small-diameter gear 14 and the outer surface S1 of the housing 2. In this case, the boss 11 configured to support the idle gear 16 may be provided to the gear cover 19.

Figure 8:
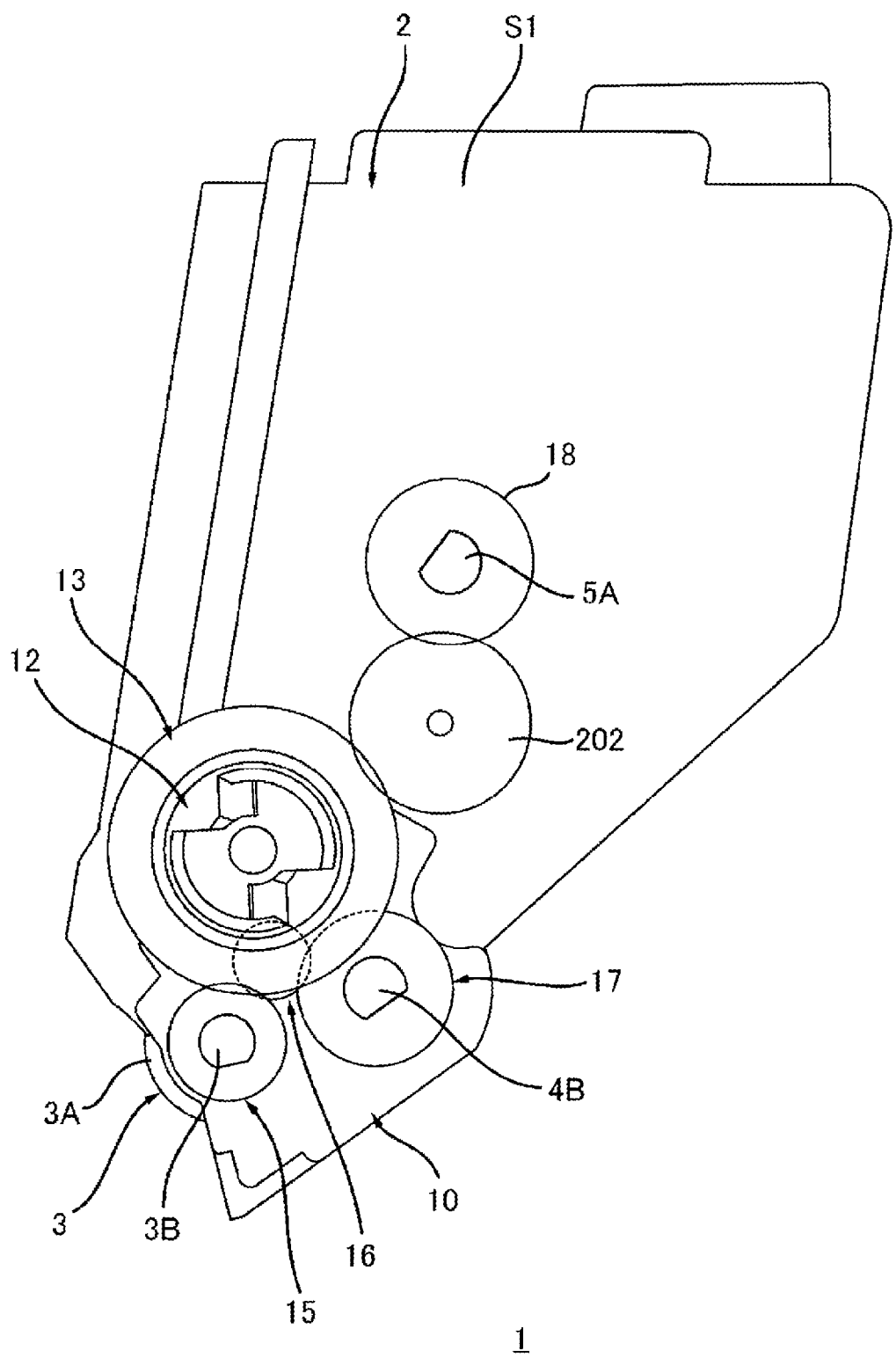
FIG. 8 depicts a modified embodiment of the developing cartridge, in which one idle gear is located between the large-diameter gear and the agitator gear.

Also, in the above illustrative embodiment, the agitator gear 18 and the large-diameter gear 13 are configured to mesh with each other. However, as shown in FIG. 8, two idle gears 201A, 201B may be located between the large-diameter gear 13 and the agitator gear 18.

Figure 9:
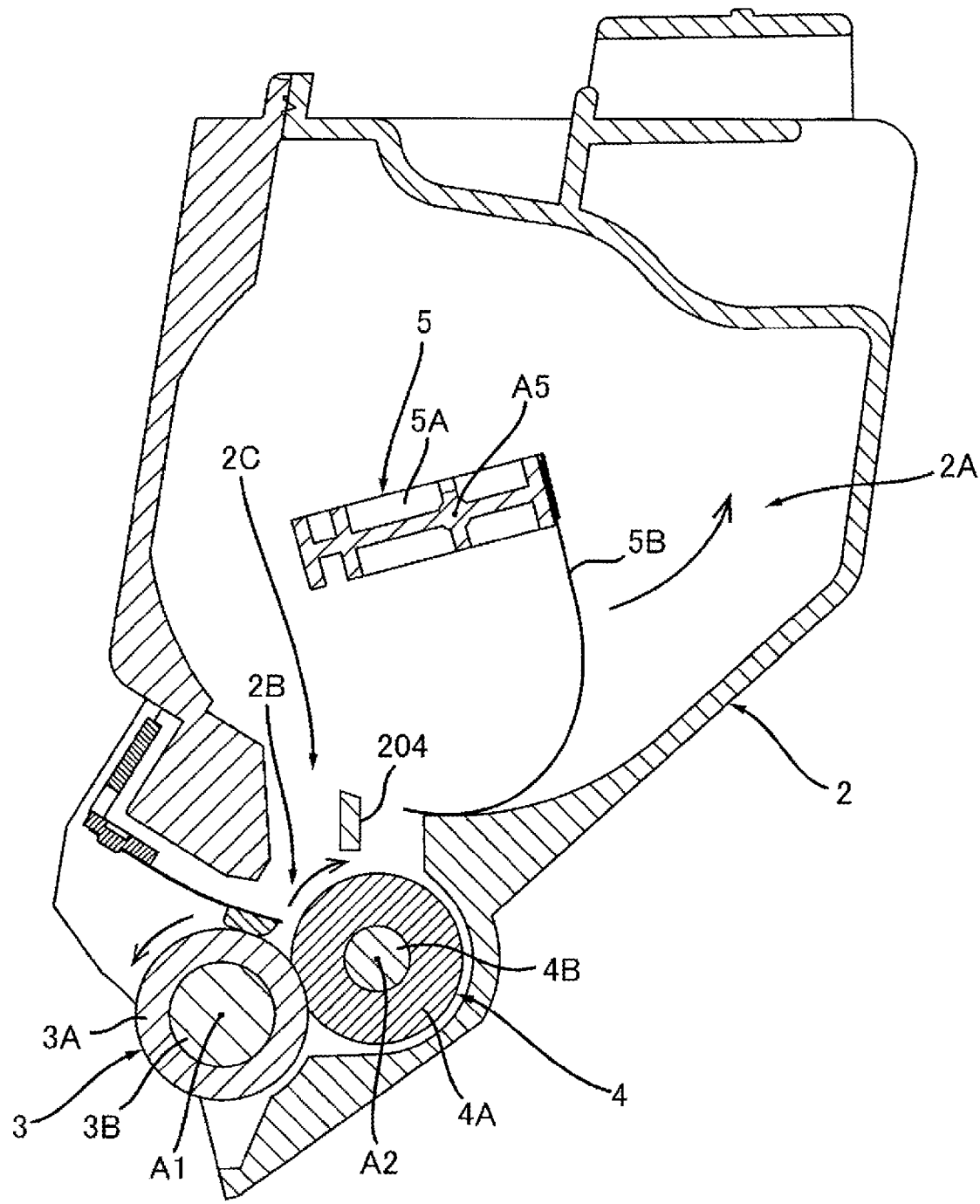
FIG. 9 depicts a modified embodiment of the developing cartridge, in which a partition wall is provided in a passage configured to interconnect a toner accommodation chamber and a developing chamber.

Also, in the above illustrative embodiment, the agitator 5 is configured to rotate in the opposite rotating direction to the supply roller 4. However, the agitator 5 may be configured to rotate in the same direction as the rotating direction of the supply roller 4. In this case, as shown in FIG. 9, one idle gear 202 may be located between the large-diameter gear 13 and the agitator gear 18.

Also, as shown in FIG. 10, the housing 2 may have a partition wall 204 for partitioning the passage 2C. Thereby, it is possible to supply the toner from the toner accommodation chamber 2A to the developing chamber 2B through one side of the partition wall 204 and to return the toner from the developing chamber 2B to the toner accommodation chamber 2A through another side of the partition wall 204.

What is claimed is:

1. A developing cartridge comprising:
   a housing capable of accommodating therein toner;
   a developing roller rotatable about a first axis extending in an axial direction;
   a supply roller rotatable about a second axis extending in the axial direction and configured to supply the toner accommodated in the housing to the developing roller;
   a coupling rotatable about a third axis extending in the axial direction;
   a developing roller gear rotatable about the first axis together with the developing roller;
   a supply roller gear rotatable about the second axis together with the supply roller;
   a large-diameter gear rotatable about the third axis together with the coupling and meshing with the developing roller gear;
   a small-diameter gear rotatable about the third axis together with the coupling, having a diameter smaller than a diameter of the large-diameter gear and located at a position different from the large-diameter gear in the axial direction, and
   an idle gear rotatable about a fourth axis extending in the axial direction and meshing with the supply roller gear and the small-diameter gear.

2. The developing cartridge according to claim 1,
   wherein the developing roller includes a developing roller shaft extending in the axial direction and rotatable about the first axis together with the developing roller, and
   wherein the supply roller includes a supply roller shaft extending in the axial direction and rotatable about the second axis together with the supply roller.

3. The developing cartridge according to claim 2,
   wherein the developing roller gear is located at one end portion of the developing roller shaft in the axial direction.

4. The developing cartridge according to claim 2,
   wherein the supply roller gear is located at one end portion of the supply roller shaft in the axial direction.

5. The developing cartridge according to claim 2, further comprising:
   a bearing having a first hole, in which the developing roller shaft is to be fitted, and a second hole, in which the supply roller shaft is to be fitted; and
   a boss extending in the axial direction from the bearing, wherein the idle gear is rotatable about the boss.

6. The developing cartridge according to claim 5,
   wherein the boss is located between the large-diameter gear and an outer surface of the housing in the axial direction.

7. The developing cartridge according to claim 1,
   wherein the small-diameter gear is located, in the axial direction, between the large-diameter gear and an outer surface of the housing in the axial direction, and
   wherein at least a part of the idle gear is located between the large-diameter gear and the outer surface of the housing in the axial direction.

8. The developing cartridge according to claim 1,
   wherein the idle gear has a helical gear,
   wherein the supply roller gear has a helical gear,
   wherein the idle gear is configured to rotate with a thrust force being applied, the thrust force being applied to the idle gear in a direction in which the idle gear is to come close to an outer surface of the housing in the axial direction, and
   wherein the supply roller gear is configured to rotate with a thrust force being applied, the thrust force being applied to the supply roller gear in a direction in which the supply roller gear is to be apart from the outer surface of the housing in the axial direction.

9. The developing cartridge according to claim 8, further comprising a gear cover covering the supply roller gear,
   wherein the gear cover has a contact surface located at an opposite side of the housing to the supply roller gear in the axial direction and being in contact with the supply roller gear.

10. The developing cartridge according to claim 9,
    wherein the contact surface is in contact with an outer surface of the supply roller gear in the axial direction.

11. The developing cartridge according to claim 1, further comprising an agitator rotatable about a fifth axis extending in the axial direction and rotatable in an opposite rotating direction to a rotating direction of the supply roller.

12. The developing cartridge according to claim 1, further comprising:
- an agitator rotatable about a fifth axis extending in the axial direction; and
- an agitator gear rotatable about the fifth axis together with the agitator and meshing with the large-diameter gear.

13. The developing cartridge according to claim 12,
- wherein the agitator includes an agitator shaft extending in the axial direction and rotatable about the fifth axis together with the agitator, and
- wherein the agitator gear is located at one end portion of the agitator shaft in the axial direction.

14. The developing cartridge according to claim 1,
- wherein the supply roller is in contact with the developing roller.

* * * * *